United States Patent [19]

Dick et al.

[11] 4,378,454
[45] Mar. 29, 1983

[54] PREPARATION OF POLYCARBONATES IN A HOMOGENEOUS SOLUTION

[75] Inventors: Kevin F. Dick; George E. Ham; James R. Gross, all of Lake Jackson, Tex.

[73] Assignee: The Dow Chemical Company, Midland, Mich.

[21] Appl. No.: 317,955

[22] Filed: Nov. 4, 1981

[51] Int. Cl.$^3$ .............................................. C08G 63/62
[52] U.S. Cl. ........................................ 526/59; 526/60; 526/71; 528/196; 528/199
[58] Field of Search ................... 528/199, 196; 526/71, 526/59, 60

[56] References Cited

U.S. PATENT DOCUMENTS 3,144,432  8/1964  Fox ..................................... 528/199
3,641,025  2/1972  Petree ............................. 260/249.5

OTHER PUBLICATIONS

Tetrahedron Letters, No. 1, 1972, pp. 27–28, Cockerill et al.

Primary Examiner—Harold D. Anderson
Attorney, Agent, or Firm—B. G. Colley

[57] ABSTRACT

Polycarbonates are prepared in homogeneous solutions from dihydric phenols and phosgene wherein the stoichiometric end point for the addition of phosgene is accurately controlled by using 4-(p-nitrobenzyl) pyridine as a colorometric indicator for the end point in a series of samples of the reaction solution.

10 Claims, No Drawings

PREPARATION OF POLYCARBONATES IN A HOMOGENEOUS SOLUTION

BACKGROUND OF THE INVENTION

This invention relates to a process of preparing polycarbonate resins in organic solutions wherein phosgene is added to a dihydric phenol and wherein the stoichiometric end point is accurately controlled by using 4-(p-nitrobenzyl) pyridine as a chromophore to indicate the end point.

It is known from U.S. Pat. No. 3,144,432 dated Aug. 11, 1964, that polycarbonate resins can be prepared by reacting phosgene and bis A in a combined pyridine-halogenated hydrocarbon solvent.

It is known from Cockerill, et al, Tetrahedron Letters 1:27–28 (1972) that the reaction of phosgene with 4-(p-nitrobenzyl) pyridine produces a color body and the pyridine compound has been used for the estimation of microgram levels of phosgene.

It is also known from U.S. Pat. No. 3,641,025 dated Feb. 8, 1972 that the 1:1 stoichiometry between reactions of acid chlorides such as phosgene and amines or alcohols or thio alcohols can be controlled or monitored by adding a fluorescent amine to samples of the reaction mixture. However, this method has the disadvantage that fluorometric analysis equipment is required.

SUMMARY OF THE INVENTION

The present invention is a method of preparing polycarbonate resins using substantially equimolar proportions of phosgene and one or more dihydric phenols in an organic solvent mixture of pyridine and a halogenated solvent wherein the addition of phosgene is controlled by a colorometric indicator so that the end point is accurately determined.

The steps of the process involve; adding phosgene incrementally to the mixture of phenol, pyridine, and halogenated solvent, taking samples of the reactants periodically and mixing them with an organic solvent containing 4-(p-nitrobenzyl)pyridine whereby the addition of phosgene is stopped when the sample solution changes from colorless to slightly yellow, and the polycarbonate resin is recovered from the solution.

The present invention provides for a polycarbonate resin prepared with an exact amount of phosgene. The use of too little phosgene has been found to result in a polycarbonate which has higher rates of discoloration, lower molecular weights and entrainment of free phenolic moieties. The use of too much phosgene leads to a free pyridine-phosgene complex and a polymer with higher amounts of color bodies. The present invention thus avoids or at least tends to ameliorate the above prior art problems.

DETAILED DESCRIPTION

The process of this invention is conducted by reacting 1.0 to 1.03 theoretical moles of phosgene for each mole of dihydric phenol or mixtures thereof at a temperature in the range from 10° to 30° C. and preferably in the range from 15° to 25° C.

The dihydric phenols are dissolved in a mixture of pyridine and a halogenated solvent. The amount of pyridine used is 2.4 to 3.0 moles and preferably 2.5 to 2.6 moles per mole of dihydric phenol. The amount of halogenated solvent used is 18.0 to 34.0 moles and preferably 26.1 to 30.0 moles per mole of dihydric phenol.

The halogenated solvents useful in this invention are methylene chloride, chloroform, carbon tetrachloride, trichloroethylene, ethylene dichloride, chlorobenzene, and mixtures thereof.

The dihydric aromatic compounds employed in the practice of this invention are known dihydric aromatic compounds in which the sole reactive groups are the two phenolic hydroxyl groups. Some of these are represented by the general formula

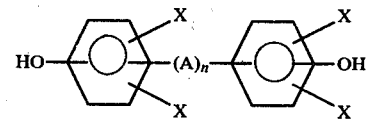

wherein A is a divalent hydrocarbon radical containing 1–15 carbon atoms,

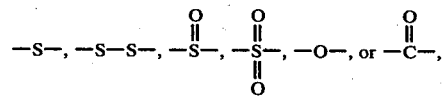

X is independently hydrogen, chlorine, bromine, fluorine, or a monovalent hydrocarbon radical such as an alkyl group of 1–4 carbons, an aryl group of 6–8 carbons such as phenyl, tolyl, xylyl, an oxyalkyl group of 1–4 carbons or an oxyaryl group of 6–8 carbons and n is 0 or 1.

One group of suitable dihydric aromatic compounds are those illustrated below:
  1,1-bis(4-hydroxyphenyl)-1-phenyl ethane
  1,1-bis(4-hydroxyphenyl)-1,1-diphenyl methane
  1,1-bis(4-hydroxyphenyl)cyclooctane
  1,1-bis(4-hydroxyphenyl)cycloheptane
  1,1-bis(4-hydroxyphenyl)cyclohexane
  1,1-bis(4-hydroxyphenyl)cyclopentane
  2,2-bis(3-propyl-4-hydroxyphenyl)decane
  2,2-bis(3,5-dibromo-4-hydroxyphenyl)nonane
  2,2-bis(3,5-isopropyl-4-hydroxyphenyl)nonane
  2,2-bis(3-ethyl-4-hydroxyphenyl)octane
  4,4-bis(4-hydroxyphenyl)heptane
  3,3-bis(3-methyl-4-hydroxyphenyl)hexane
  3,3-bis(3,5-dibromo-4-hydroxyphenyl)hexane
  2,2-bis(3,5-difluoro-4-hydroxyphenyl)butane
  2,2-bis(4-hydroxyphenyl)propane (Bis A)
  1,1-bis(3-methyl-4-hydroxyphenyl)ethane
  1,1-bis(4-hydroxyphenyl)methane.

Another group of dihydric aromatic compounds useful in the practice of the present invention include the dihydroxyl diphenyl sulfoxides such as for example:
  bis(3,5-diisopropyl-4-hydroxyphenyl)sulfoxide
  bis(3-methyl-5-ethyl-4-hydroxyphenyl)sulfoxide
  bis(3,5-dibromo-4-hydroxyphenyl)sulfoxide
  bis(3,5-dimethyl-4-hydroxyphenyl)sulfoxide
  bis(3-methyl-4-hydroxyphenyl)sulfoxide
  bis(4-hydroxyphenyl)sulfoxide.

Another group of dihydric aromatic compounds which may be used in the practice of the invention includes the dihydroxyaryl sulfones such as, for example:
  bis(3,5-diisopropyl-4-hydroxyphenyl)sulfone
  bis(3,5-methyl-5-ethyl-4-hydroxyphenyl)sulfone
  bis(3-chloro-4-hydroxyphenyl)sulfone
  bis(3,5-dibromo-4-hydroxyphenyl)sulfone bis(3,5-dimethyl-4-hydroxyphenyl)sulfone
bis(3-methyl-4-hydroxyphenyl)sulfone
bis(4-hydroxyphenyl)sulfone.

Another group of dihydric aromatic compounds useful in the practice of the invention includes the dihydroxydiphenyls:

3,3′,5,5′-tetrabromo-4,4′-dihydroxydiphenyl
3,3′-dichloro-4,4′-dihydroxydiphenyl
3,3′-diethyl-4,4′-dihydroxydiphenyl
3,3′-dimethyl-4,4′-dihydroxydiphenyl
p,p′-dihydroxydiphenyl.

Another group of dihydric aromatic compounds which may be used in the practice of the invention includes the dihydric phenol ethers:

bis(3-chloro-5-methyl-4-hydroxyphenyl)ether
bis(3,5-dibromo-4-hydroxyphenyl)ether
bis(3,5-dichloro-4-hydroxyphenyl)ether
bis(3-ethyl-4-hydroxyphenyl)ether
bis(3-methyl-4-hydroxyphenyl)ether It is, of course, possible to employ a mixture of two or more different dihydric aromatic compounds in preparing the thermoplastic carbonate polymers of the invention.

The 4-(p-nitrobenzyl)pyridine (NBP) used herein is dissolved in organic solvents such as tetrahydrofuran, acetone, methyl ethyl ketone, methanol, and toluene. The concentration of the NBP in the solvent is 0.01 to 0.5 weight percent and preferably 0.05 to 0.15%. A small sample of the reaction mixture is removed by a spatula and stirred into 1-3 cc of the above NBP solution. The development of a slight yellow coloration with one sample after a previous negative coloration with another sample is an accurate determination of the end point.

The following examples are presented to illustrate but not limit the invention.

EXAMPLES 1-3

To prepare the polycarbonate resin, 272.4 gm (1.2 moles, 2.4 equivalents) of bisphenol-A and 4.5 gm (0.03 moles/equivalents) of paratertiarybutylphenol were charged to a five liter, five neck round-bottom flask equipped with mechanical agitator, condenser, thermometer, and dip leg for subsurface addition of phosgene. The solid monomers were slurried in 2000 ml of methylene chloride with a constant nitrogen purge in progress. The slurry was cooled to 10° C. using an ice/water combination. To the slurry was added 240 gm (3.04 moles/equivalents) of distilled pyridine with additional nitrogen purge for fifteen minutes after addition. This was followed by varying amounts of gaseous addition of phosgene. Additional condensing agent may be required should the monomers solution contain water. The completion of reaction was confirmed by using a 0.1 wt. % solution of 4-(paranitrobenzyl) pyridine in tetrahydrofuran.

To carry out the analysis for excess phosgene, 1-2 ml of 0.1 wt.% 4-(paranitrobenzyl)pyridine in tetrahydrofuran solution were placed in a four dram vial. A small spatula was then dipped into the agitated polymer solution and removed. Enough of the viscous solution adhered to the spatula so that it may be combined with the indicator by stirring. Formation of a yellow chromophore by the combination of the indicator solution with the increment of the reaction mixture was indicative of an excess of phosgene being present.

The polymer solution was then neutralized with 1500 ml of 10 wt. % hydrochloric acid. This was followed by washing with 2000 ml of 10 wt. % hydrochloric acid solution and 2000 ml of deionized water. The solution was then coalesced and the remaining aqueous layer discarded. This was followed by treatment of the polymer solution with ion exchange resin for removal of pyridine and water. The resin was separated from the polymer solution by filtration through a fritted glass funnel and diatomaceous earth. The clear, dried solution was then ready for recovery of the solid resin.

The dried, clear solution was then subjected to treatment with hydrocarbon antisolvent, precipitating the polymer for recovery in a fine powdered form. The polymer was dried at 250° F. This was followed by injection molding at 575° F. into transparent sample test discs, 2″ in diameter by ⅛″ thick. The samples were tested for color as molded and after exposure to elevated temperature (heat aging) in accordance with the ASTM Yellowness Index Test D-1925. The results are as follows:

By the Yellowness Index Test, the higher the number the greater the color. As can be seen from the above example, use of 4-(para nitrobenzyl) pyridine to more accurately control addition of phosgene will contribute to the production of polycarbonate resin with low initial color and improved resistance to thermal degradation.

| Example | PHOSGENE % of Stoichiometric Charge Theoretical | Actual | Colorimetric Endpoint | Molded At 575° F. | Heat Aged* |
|---|---|---|---|---|---|
| 1. | 98.0 | — | Clear (−) | 2.8 | 7.9 |
| 2. | 110.0 | 101.0 | Yellow (+) | 3.4 | 6.1 |
| 3. | 116.0 | 115.0 | Orange (++) | 5.4 | 8.8 |

*240° F. for 100 hours

We claim:
1. A method for the preparation of a polycarbonate resin using substantially equimolar proportions of phosgene and one or more dihydric phenols dissolved in an organic solvent mixture containing pyridine and a halogenated solvent which comprises
   (a) adding phosgene incrementally to said one or more dihydric phenols in said solvent mixture to form a polycarbonate solution,
   (b) periodically mixing a sample of said polycarbonate solution in an organic solution of 4-(p-nitrobenzyl) pyridine to visually detect a color change at the stoichiometric end point whereby the addition of phosgene is stopped when said sample solution changes from colorless to slightly yellow, and
   (c) recovering said polycarbonate resin.
2. The method as set forth in claim 1 wherein the halogenated solvent is selected from the group consisting of methylene chloride, chloroform, carbon tetrachloride, trichloro ethylene, ethylene dichloride, chloro benzene and mixtures thereof.
3. The method as set forth in claim 2 wherein the halogenated solvent is methylene chloride.
4. The method as set forth in claim 1 wherein the amount of pyridine used is 2.4 to 3.0 moles per mole of dihydric phenol and the amount of halogenated solvent used is 18.0 to 34.0 moles per mole of dihydric phenol.
5. The method as set forth in claim 1 wherein said dihydric phenol is 2,2-bis(4-hydroxyphenyl) propane.
6. A method for the preparation of a polycarbonate resin using substantially equimolar proportions of phos- gene and one or more dihydric phenols which comprises (a) adding phosgene incrementally to one or more dihydric phenols having the formula

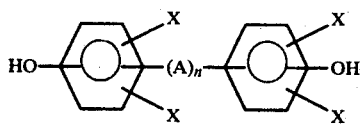

herein A is a divalent hydrocarbon radical containing 1-15 carbon atoms,

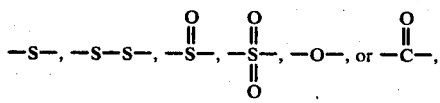

X is independently hydrogen, chlorine, bromine, fluorine, or a monovalent hydrocarbon radical such as an alkyl group of 1-4 carbons, an aryl group of 6-8 carbons such as phenyl, tolyl, xylyl, an oxyalkyl group of 1-4 carbons or an oxyaryl group of 6-8 carbons and n is 0 or 1, wherein said one or more dihydric phenols are dissolved in an organic solvent mixture containing pyridine and a halogenated solvent, (b) periodically mixing a sample of said polycarbonate solution in an organic solution of 4-(p-nitrobenzyl) pyridine to visually detect a color change at the stoichiometric end point whereby the addition of phosgene is stopped when said sample solution changes from colorless to slightly yellow, and (c) recovering said polycarbonate resin.

7. The method as set forth in claim 6 wherein the halogenated solvent is selected from the group consisting of methylene chloride, chloroform, carbon tetrachloride, trichloro ethylene, ethylene dichloride, chloro benzene, and mixtures thereof.

8. The method as set forth in claim 7 wherein the halogenated solvent is methylene chloride.

9. The method as set forth in claim 6 wherein the amount of pyridine used is 2.4 to 3.0 moles per mole of dihydric phenol and the amount of halogenated solvent used is 18.0 to 34.0 moles per mole of dihydric phenol.

10. The method as set forth in claim 6 wherein said dihydric phenol is 2,2-bis(4-hydroxy phenyl) propane.

* * * * *